(12) United States Patent
Hammond, Jr. et al.

(10) Patent No.: US 11,148,517 B2
(45) Date of Patent: Oct. 19, 2021

(54) UNIVERSAL PLATFORM FOR LIGHTWEIGHT VEHICLE

(71) Applicant: Textron Inc., Providence, RI (US)

(72) Inventors: Donny Lee Hammond, Jr., Augusta, GA (US); Sam Dean Smith, Martinez, GA (US); Trevor Douglas Roebuck, Evans, GA (US); Landon Niles Ball, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 34 days.

(21) Appl. No.: 16/383,073

(22) Filed: Apr. 12, 2019

(65) Prior Publication Data

US 2020/0324637 A1    Oct. 15, 2020

(51) Int. Cl.
*B60K 1/04* (2019.01)
*B62D 25/20* (2006.01)

(52) U.S. Cl.
CPC ............... *B60K 1/04* (2013.01); *B62D 25/20* (2013.01); *B60K 2001/0438* (2013.01); *B60Y 2200/23* (2013.01)

(58) Field of Classification Search
CPC .. B60K 1/04; B60K 2001/0438; B62D 25/20; B60Y 2200/23
See application file for complete search history.

(56) References Cited

U.S. PATENT DOCUMENTS

| | | | |
|---|---|---|---|
| 7,036,848 B2* | 5/2006 | Chernoff | B60H 1/004 280/782 |
| 7,874,605 B2* | 1/2011 | Smith | B60N 2/3011 296/64 |
| 9,045,163 B2 | 6/2015 | Theodore | |
| 2003/0029652 A1* | 2/2003 | Lan | B62M 6/75 180/68.5 |
| 2004/0189054 A1* | 9/2004 | Chernoff | B60K 15/07 296/203.01 |
| 2015/0239331 A1* | 8/2015 | Rawlinson | B60K 1/04 180/68.5 |
| 2016/0226041 A1* | 8/2016 | Jackson | H01M 50/20 |
| 2017/0210433 A1* | 7/2017 | Radenbaugh | B62D 51/02 |
| 2018/0072352 A1* | 3/2018 | Shimoda | B60R 16/04 |
| 2018/0154754 A1* | 6/2018 | Rowley | B60K 1/04 |
| 2018/0261899 A1* | 9/2018 | Milton | H01M 10/6567 |

* cited by examiner

*Primary Examiner* — Bryan A Evans
(74) *Attorney, Agent, or Firm* — Sandberg Phoenix and von Gontard

(57) ABSTRACT

A universal assembly platform for lightweight vehicles including a main vehicle chassis structure, a floorboard disposed over a top of the main vehicle chassis structure. The floorboard defines a floor surface of a lightweight vehicle that is subsequently assembled utilizing the universal assembly platform. The platform additionally includes at least one energy cell reservoir disposed below the floorboard. The at least one energy cell reservoir is structured and operable to retain at least one prime mover energy cell that will provide electrical energy to power an electric motor of the lightweight vehicle subsequently assembled utilizing the universal assembly platform.

20 Claims, 16 Drawing Sheets

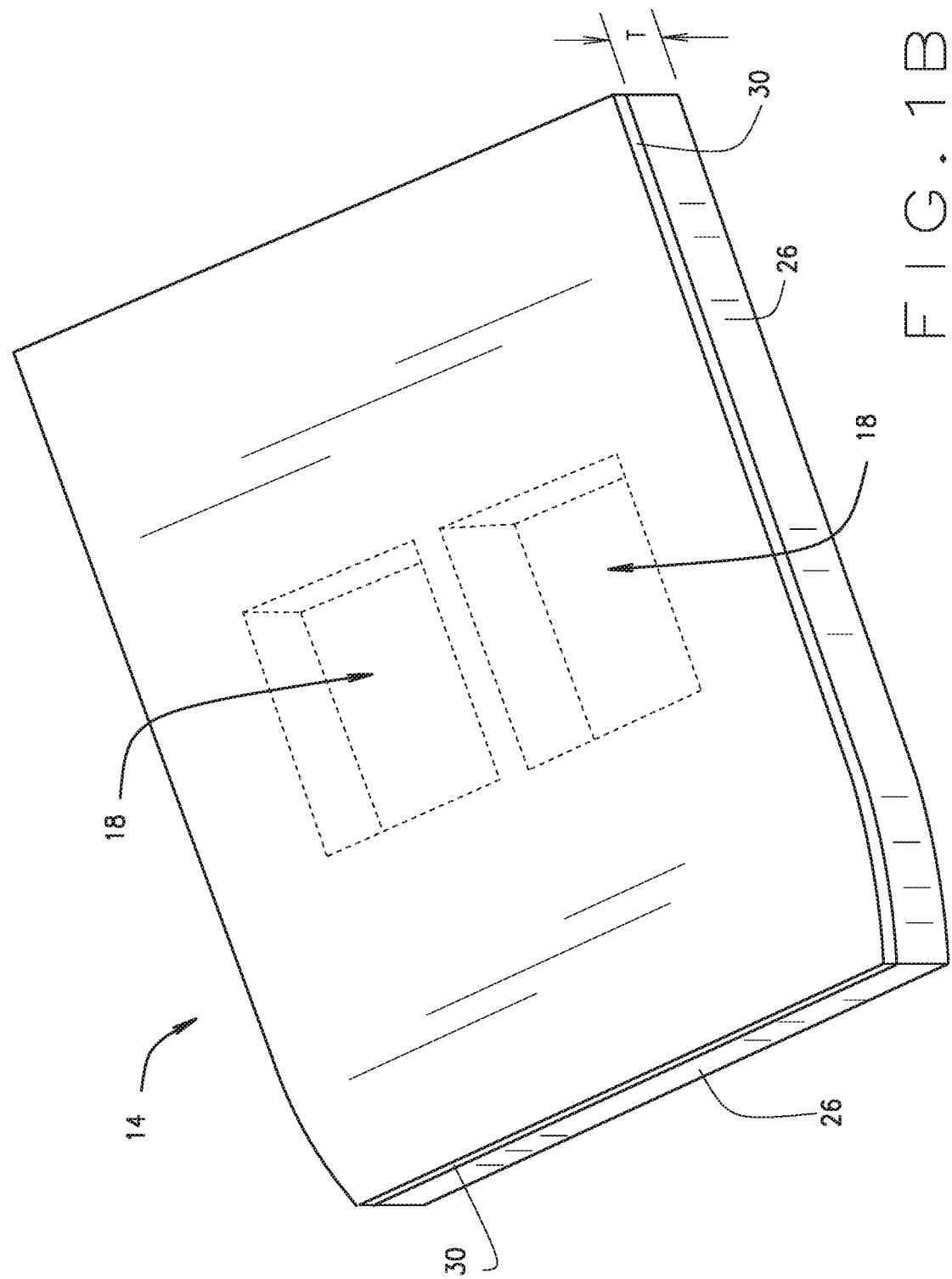

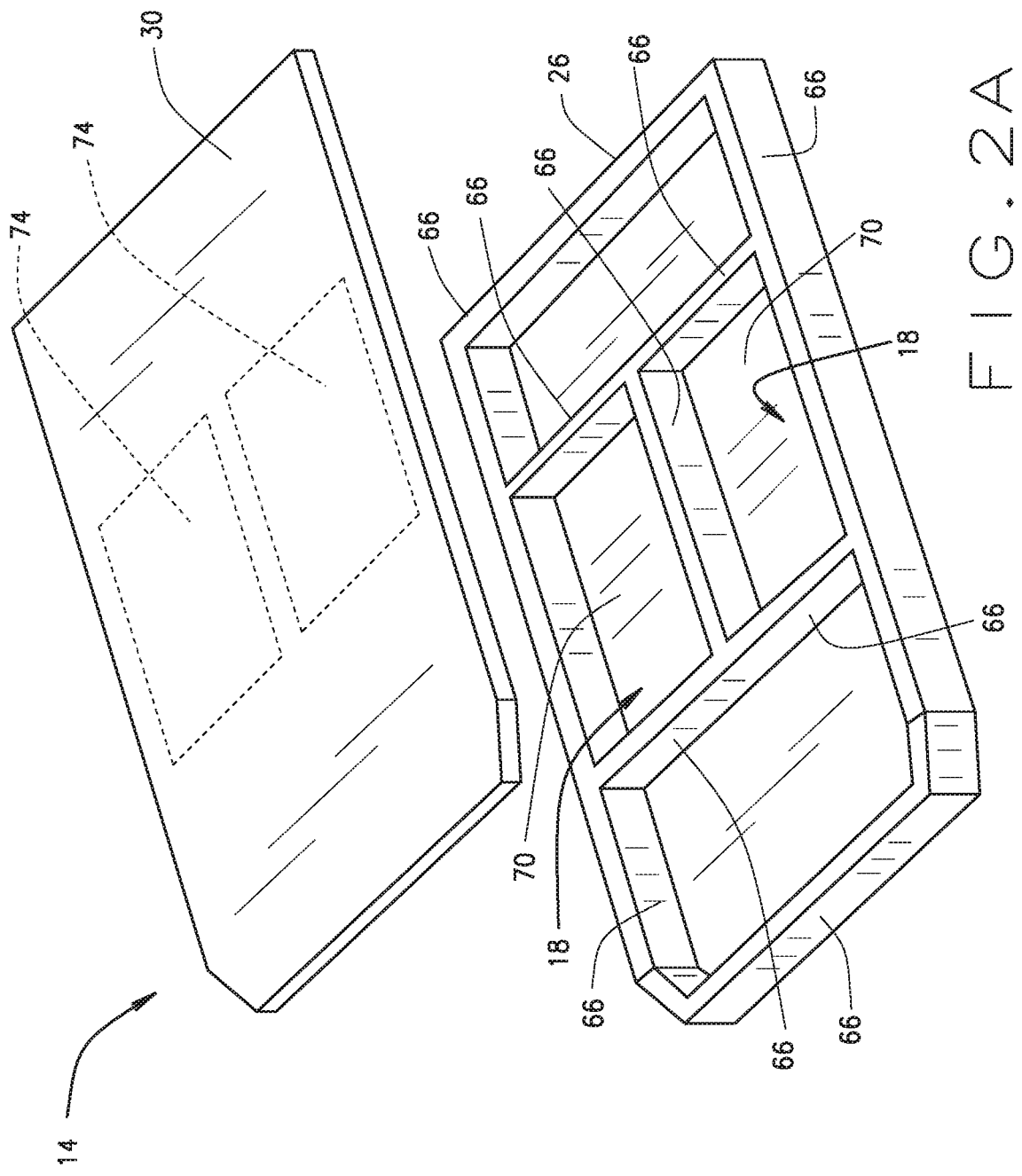

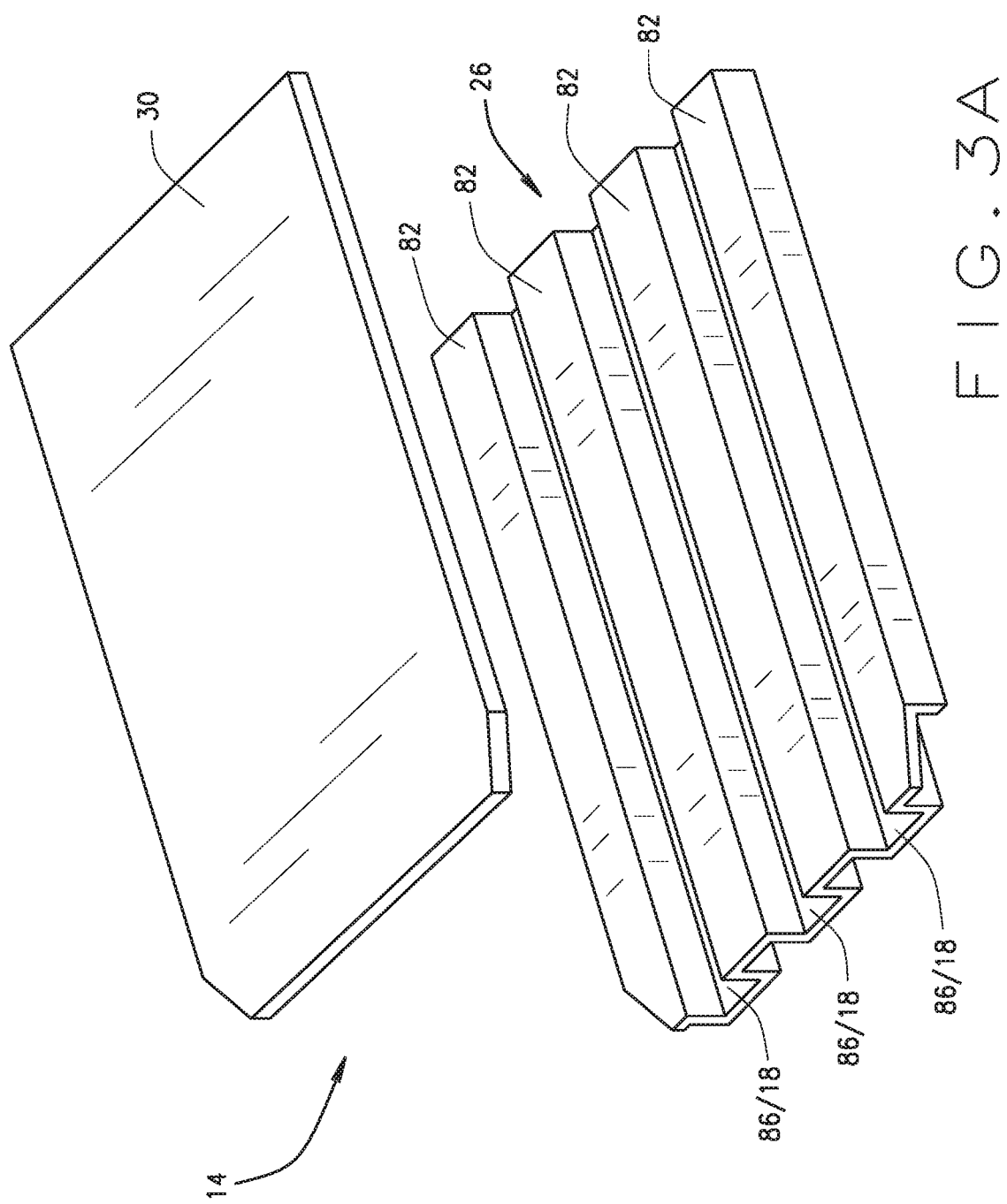

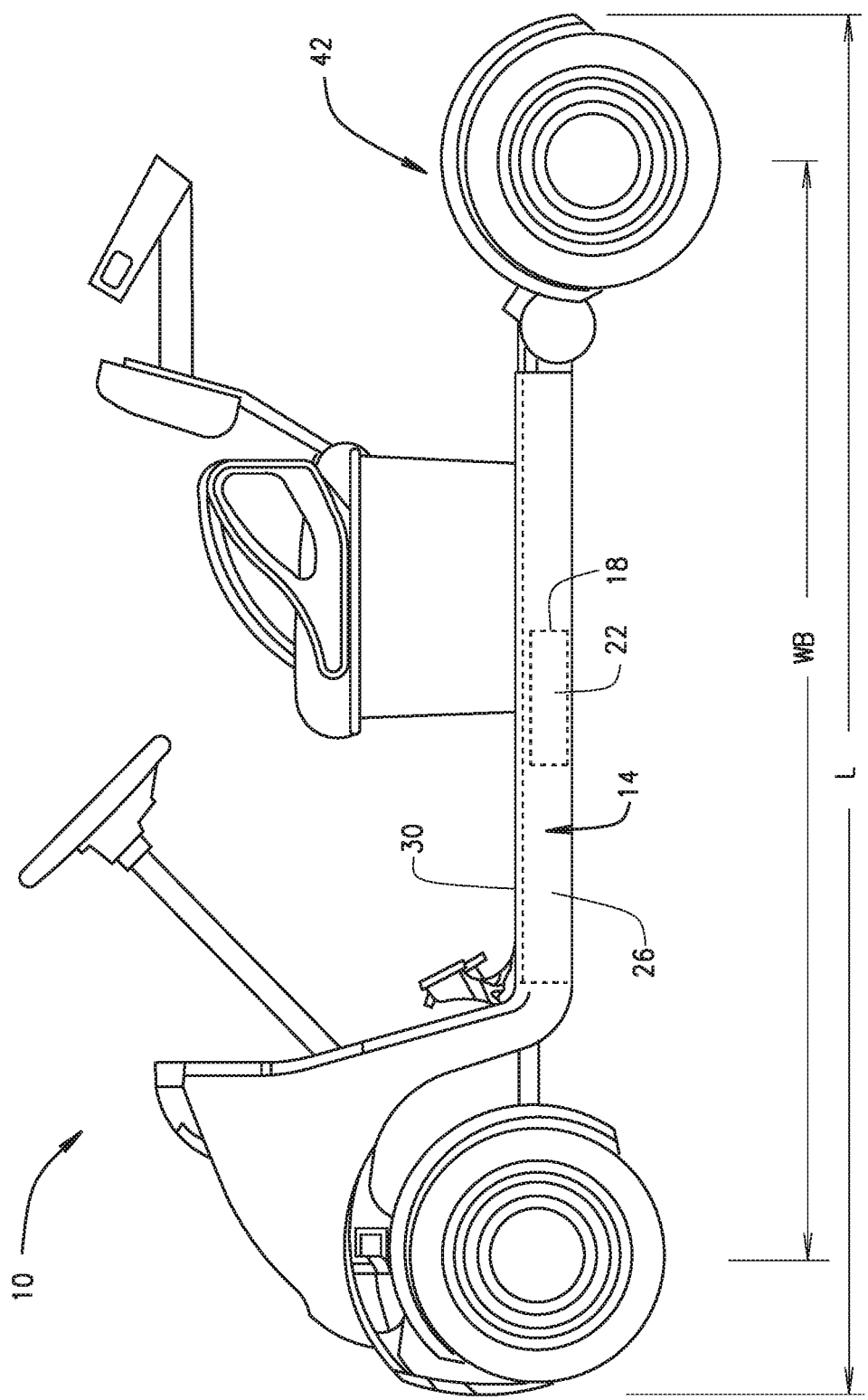

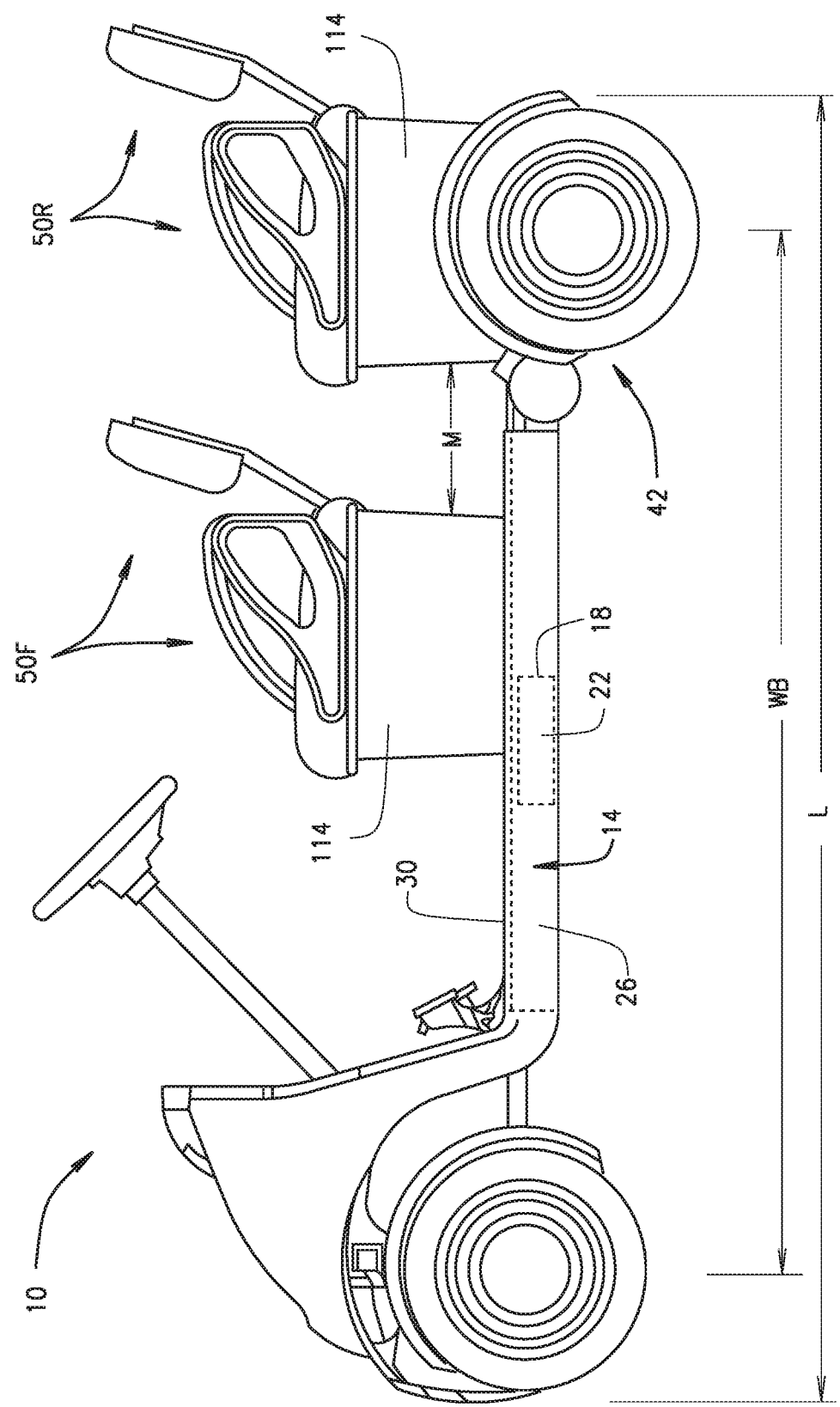

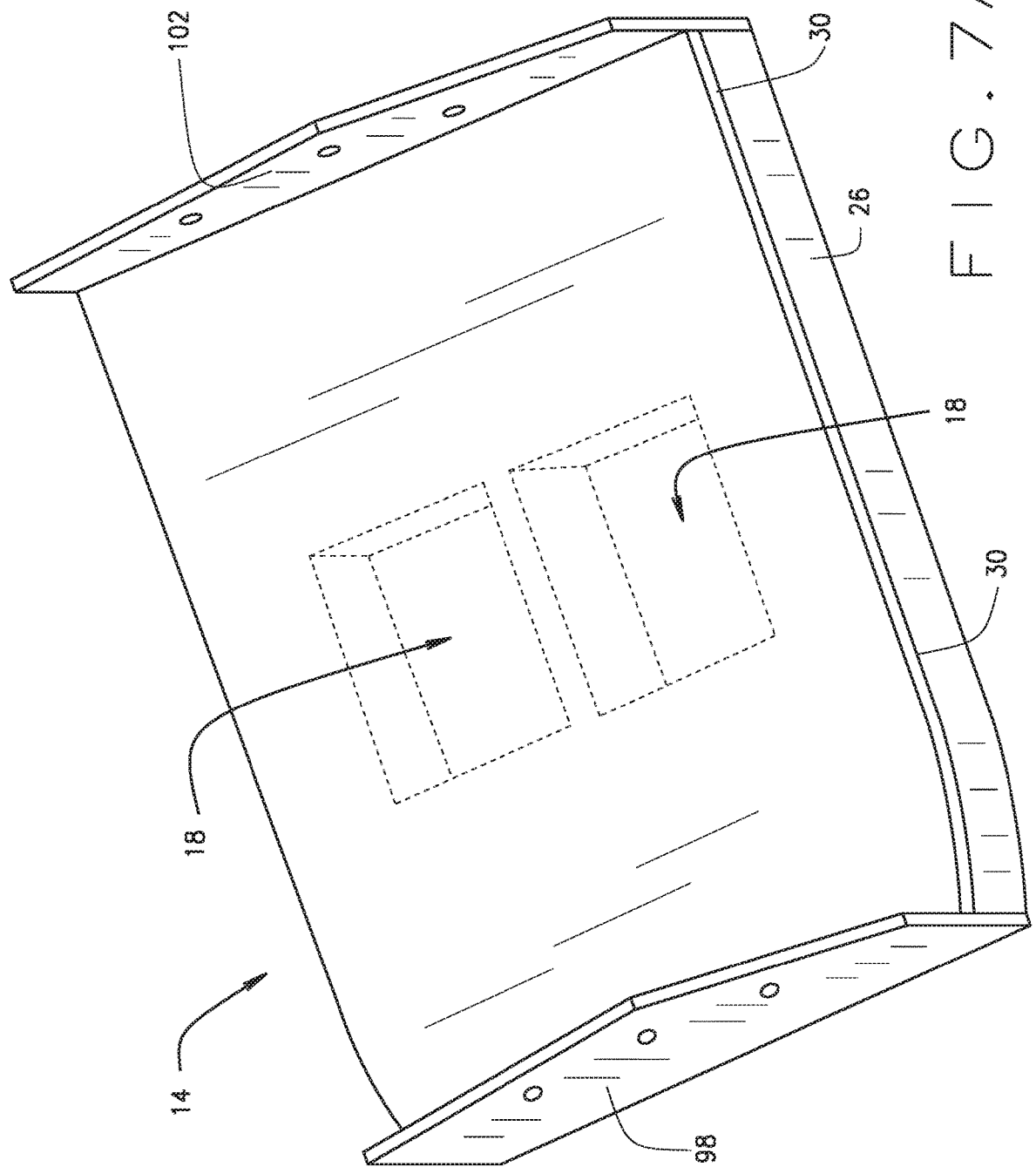

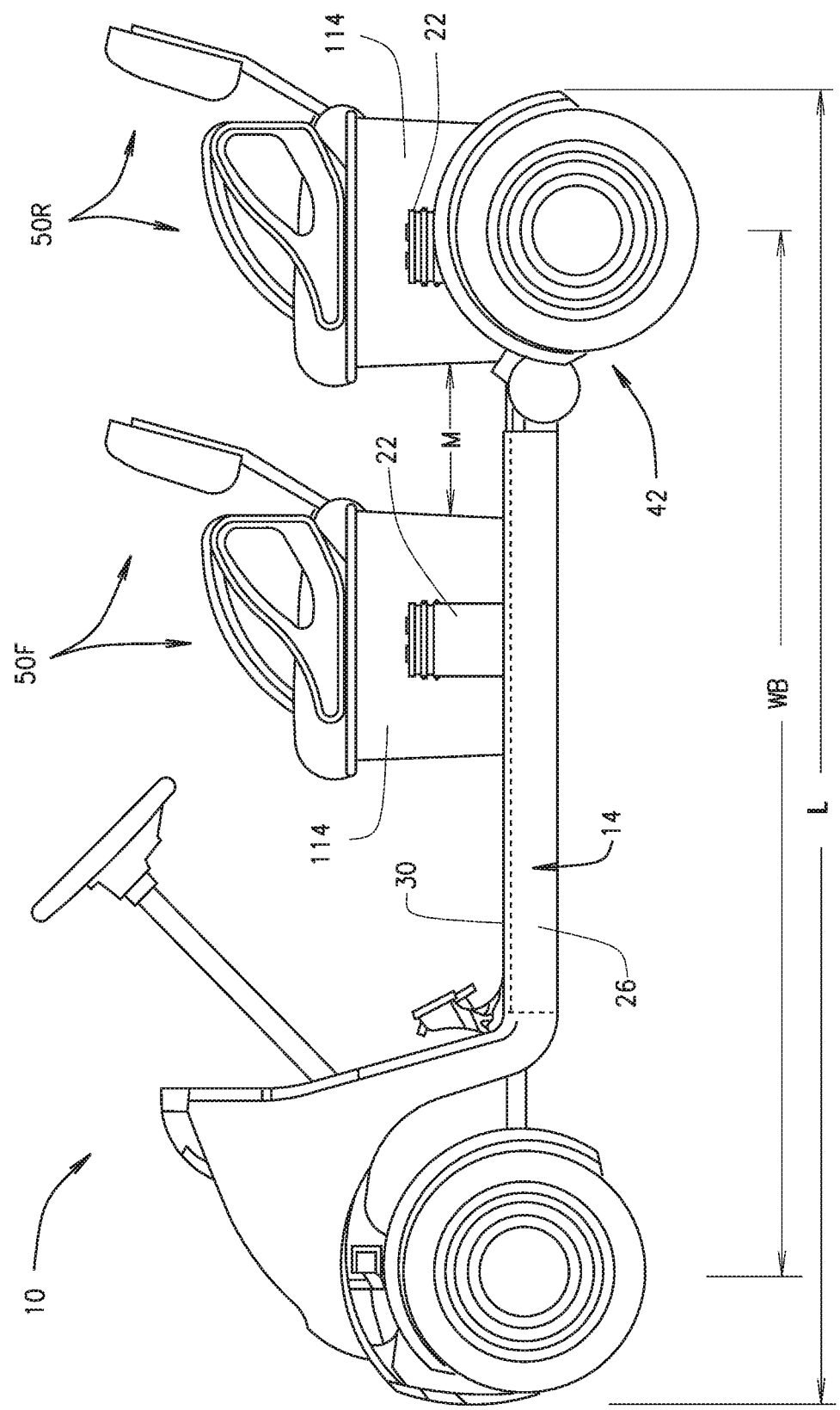

UNIVERSAL PLATFORM FOR LIGHTWEIGHT VEHICLE

CROSS-REFERENCE TO RELATED APPLICATIONS

The present application is related in general subject matter to an application by the Applicant of the present application U.S. Ser. No. 16/383,041, filed Apr. 12, 2019. Said application is assigned to the same assignee as the present application, is being filed concurrently with the present application, and is hereby incorporated by reference in its entirety into the present application.

FIELD

The present teachings relate to lightweight vehicles, and more particularly to a universal lightweight base platform that can be selectively outfitted to construct a variety of different lightweight vehicles.

BACKGROUND

The statements in this section merely provide background information related to the present disclosure and may not constitute prior art.

Lightweight vehicles are quite capable in a wide variety of riding environments and situations, whether for sport or utility purposes. The ability of the vehicles to carry multiple occupants makes them socially enjoyable to ride as well. The vehicles can be easy to enter and exit and easy to operate with controls and ergonomics somewhat similar to automobiles. Many lightweight vehicles have similar layouts for their major components, there exists a need to improve lightweight vehicle layout.

SUMMARY

In various embodiments, the present disclosure provides a universal assembly platform for lightweight vehicles. In various instances, the platform includes a main vehicle chassis structure, a floorboard disposed over a top of the main vehicle chassis structure. The floorboard defines a floor surface of a lightweight vehicle that is subsequently assembled utilizing the universal assembly platform. The platform additionally includes at least one energy cell reservoir disposed below the floorboard. The at least one energy cell reservoir is structured and operable to retain at least one prime mover energy cell that will provide electrical energy to power an electric motor of the lightweight vehicle subsequently assembled utilizing the universal assembly platform.

In various other embodiments, the present disclosure provides a lightweight vehicle that comprises a universal assembly platform, wherein the universal assembly platform includes a main vehicle chassis structure, a floorboard disposed over a top of the main vehicle chassis structure. The floorboard defines a floor surface of the lightweight vehicle. The platform additionally includes at least one energy cell reservoir disposed below the floorboard. The vehicle additionally comprises a front suspension connected to the universal assembly platform, a rear suspension connected to the universal assembly platform, at least one prime mover energy cell disposed within the at least one energy cell reservoir such that the at least one prime mover energy cell is disposed beneath the floorboard, and an electric motor electrically connected to the at least one prime mover energy cell.

In yet other embodiments, the present disclosure provides a lightweight vehicle that comprises a universal assembly platform, wherein the universal assembly platform comprises a main vehicle chassis structure, a floorboard disposed over a top of the main vehicle chassis structure. The floorboard defines a floor surface of the lightweight vehicle. The platform additionally includes at least one energy cell reservoir disposed below the floorboard. The vehicle additionally comprises a front suspension connected to the universal assembly platform, a rear suspension connected to the universal assembly platform, at least one prime mover energy cell disposed within the at least one energy cell reservoir such that the at least one prime mover energy cell is disposed beneath the floorboard, and an electric motor (e.g., a permanent magnet AC motor or induction AC motor) electrically connected to the at least one prime mover energy cell. Still further, the vehicle comprises a forward facing front seat mounted to universal assembly platform, and a forward facing rear seat mounted to the universal assembly platform rearward of the forward facing front seat.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1B is an isometric block diagram of the universal assembly platform shown in FIG. 1A having at least one energy cell reservoir formed therein, in accordance with various embodiments of the present disclosure.

FIG. 2A is an exploded view of an exemplary embodiment of the universal assembly platform shown in FIGS. 1A and 1B, in accordance with various embodiments of the present disclosure.

FIG. 3A is an exploded view of an exemplary embodiment of the universal assembly platform shown in FIGS. 1A and 1B, in accordance with yet other various embodiments of the present disclosure.

FIG. 6A is an exemplary illustration of a vehicle assembled utilizing the universal assembly platform shown in FIGS. 1A and 1B having an independent rear suspension and wheel assembly that is mounted to the rearward end of the universal assembly platform, wherein the vehicle is configured as a golf car, in accordance with various embodiments of the present disclosure.

Figure 1A:
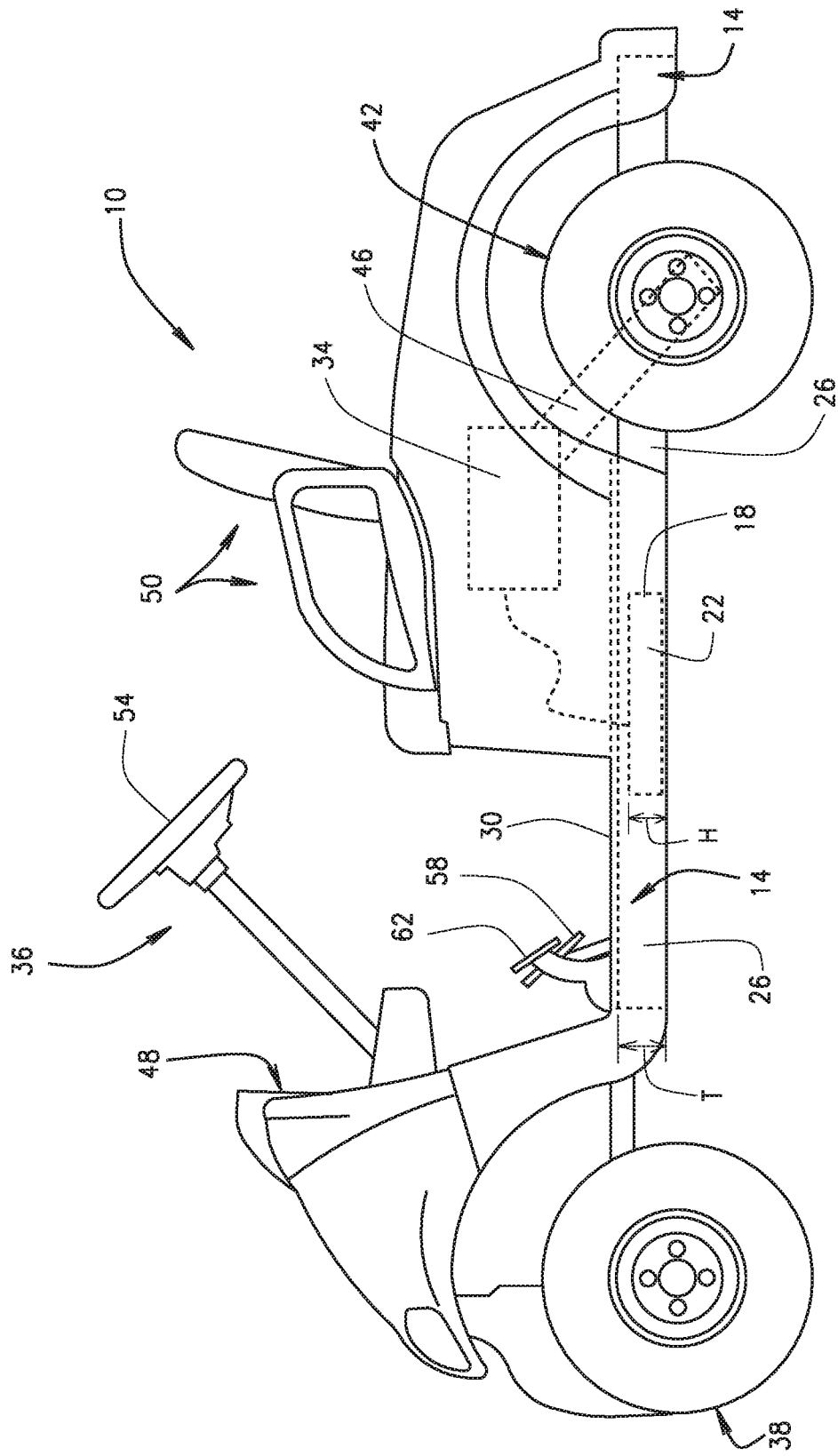
FIG. 1A is a side view of lightweight vehicle comprising a universal assembly platform having at least one energy cell disposed therein, in accordance with various embodiments of the present disclosure.

FIG. 6C is an exemplary illustration of a vehicle assembled utilizing the universal assembly platform shown in FIGS. 1A and 1B having an independent rear suspension and wheel assembly that is mounted to the rearward end of the universal assembly platform, wherein the vehicle is configured as a passenger transport vehicle having two forward facing seats, in accordance with various embodiments of the present disclosure.

FIG. 7A is an exemplary illustration of the universal assembly platform shown in FIGS. 1A and 1B having a front bulkhead and/or a rear bulkhead attached thereto, in accordance with various embodiments of the present disclosure.

Figure 7B:
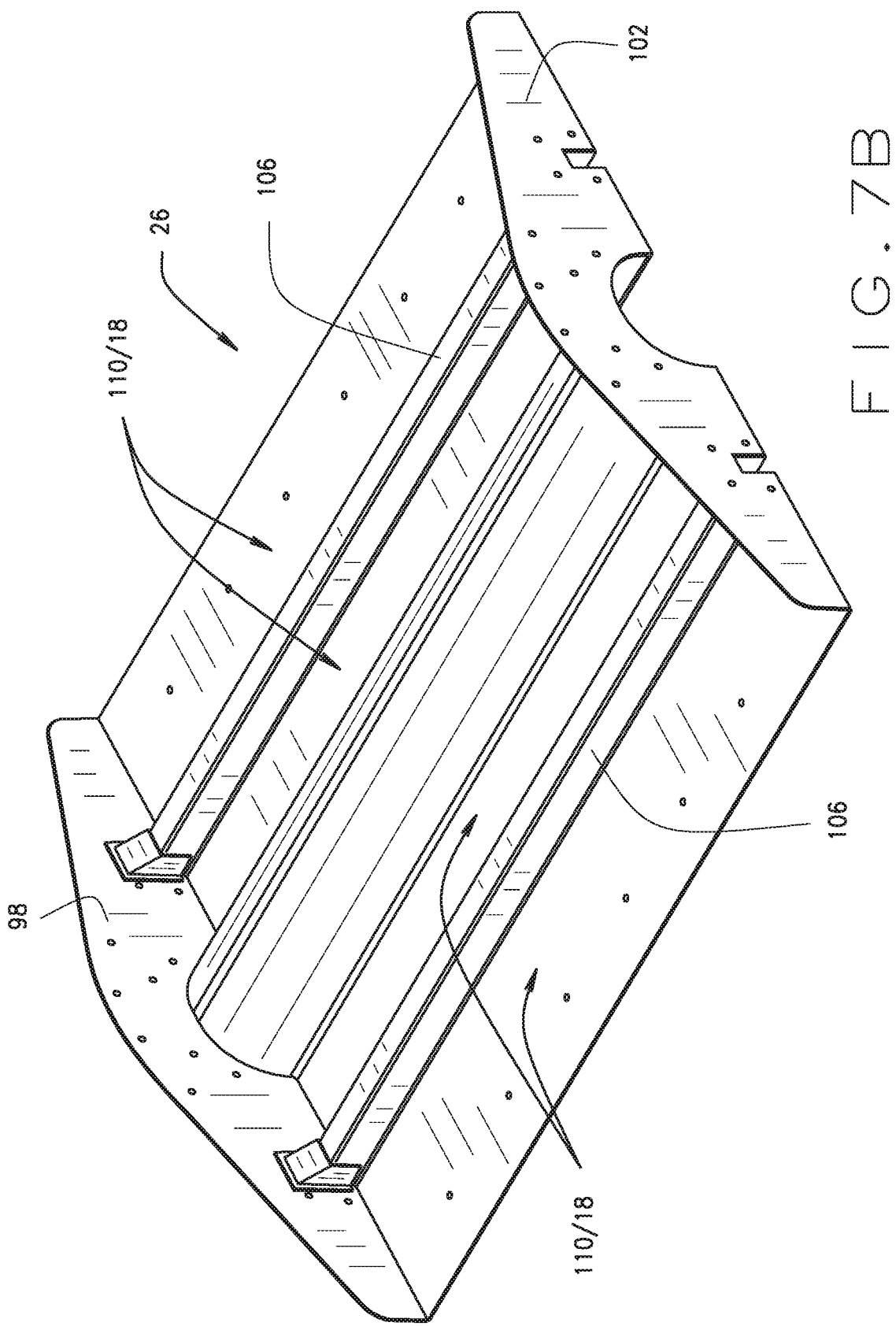

FIG. 7B is an exemplary illustration of a main chassis structure of the universal assembly platform shown in FIGS. 1A and 1B having a front bulkhead and/or a rear bulkhead attached thereto, in accordance with various embodiments of the present disclosure.

Figure 8:
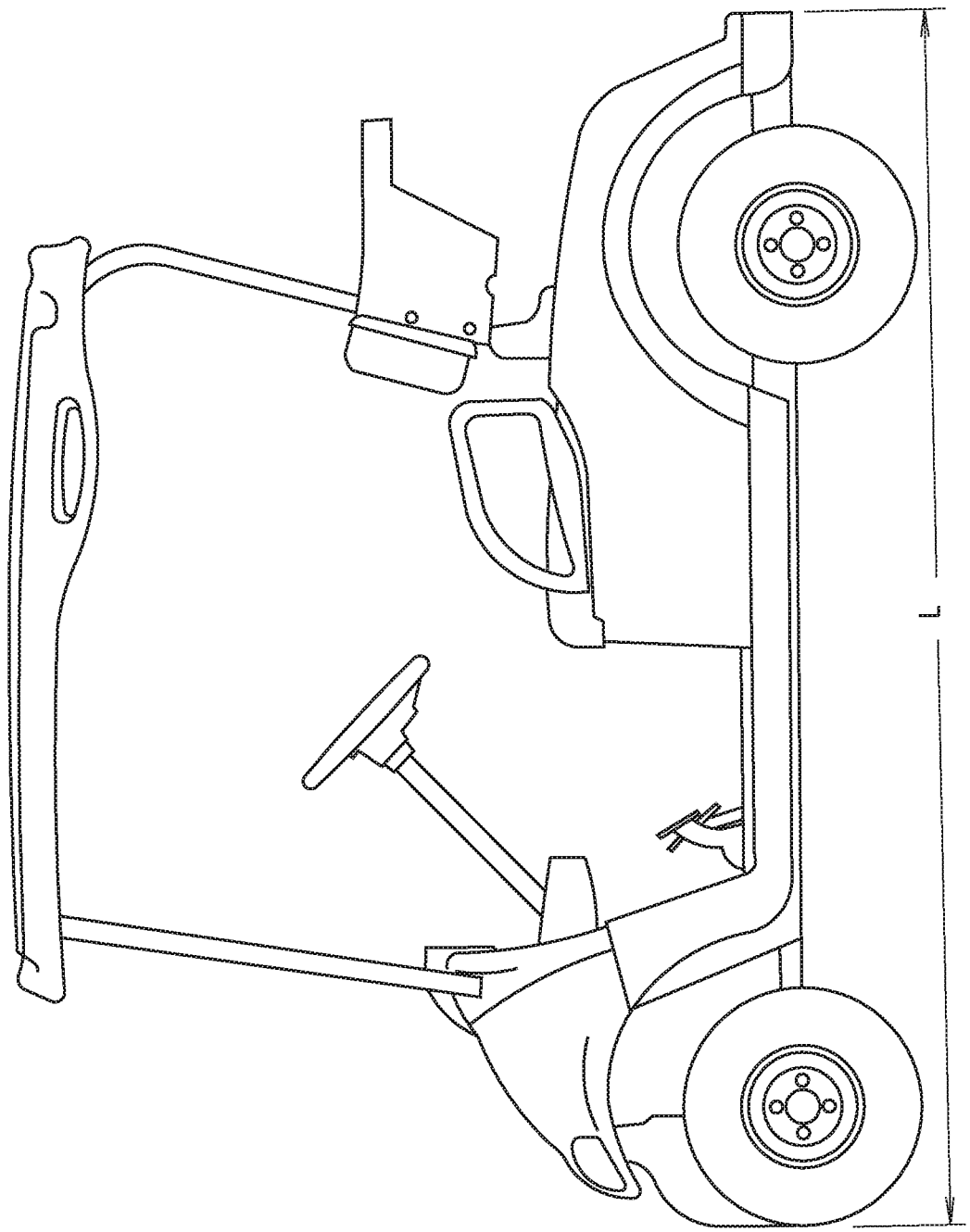

FIG. 8 is an example of a known lightweight vehicle, e.g., a golf car constructed using a known chassis and suspension system.

FIG. 9 is an exemplarily illustration of a vehicle assembled utilizing the universal assembly platform shown in FIGS. 1A and 1B having an two rows if forward facing seats and energy cells disposed at least partially above a floorboard of the universal assembly platform, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIGS. 1A and 1B, FIG. 1A exemplarily illustrates a generic lightweight vehicle 10 assembled, built, or constructed utilizing a universal assembly platform 14. In various embodiments, the vehicle 10 includes a prime mover 34, a passenger compartment 36, a front suspension and wheel assembly 38 mounted to or connected to the universal assembly platform 14, a rear suspension and wheel assembly 42 mounted to or connected to the universal assembly platform 14, and a drivetrain 46 operably connecting the prime mover 34 to the rear suspension and wheel assembly 42 and/or the front suspension and wheel assembly 38. Hence, the vehicle 10 can be configured as desired to be a two wheel drive (2WD) or a four wheel drive (4WD) vehicle.

In various embodiments, the prime mover 34 can comprise an electric motor, while in various other embodiments, the prime mover 34 can comprise an internal combustion engine. However, for the simplicity and concision, the vehicle 10 and universal assembly platform 14 will be described herein with regard to the electric motor embodiments.

In such embodiments wherein the prime mover 34 comprises an electric motor, the vehicle 10 additionally comprises at least one energy cell 22, and the universal assembly platform 14 comprises at least one energy cell reservoir 18 disposed therein (e.g., internally within universal assembly platform 14) that is/are structured and operable to retain the energy cell(s) 22. More specifically, the universal assembly platform 14 comprises a main vehicle chassis structure 26, a floorboard 30 disposed over a top of the main vehicle chassis structure 26, and the at least one energy cell reservoir 18 is disposed, provided or formed below the floorboard 30. The floorboard 30 defines a floor surface of a lightweight vehicle 10. The electric powered lightweight vehicle 10 can be any electric powered lightweight vehicle that is not designated for use on roadways, e.g., golf cars, maintenance vehicles, cargo vehicles, shuttle vehicles, etc.

The energy cell(s) 22 can be any suitable energy cell that can be manufactured to have generally any desired shape and size. For example, in various embodiments, the energy cell(s) 22 can low profile lithium ion batteries fabricated to fit within any shape and size energy cell reservoir(s) 18. Particularly, as described above, the energy cell reservoir(s) 18 is/are formed internally within the universal assembly platform 14, such that the energy cell(s) 22 will be disposed beneath the floorboard 30. Therefore, in various embodiments, the energy cell(s) 22 will have a height H that is less than a thickness T of the main vehicle chassis structure 26 (e.g. low profile), and can have any desired length, width and shape.

Although the embodiments wherein the prime mover 34 comprises the electrical motor will be described herein as having the energy cell(s) 22 being low profile energy cell(s) (e.g., low profile lithium ion batteries), it is envisioned that in various instances, such electrical motor embodiments of the vehicle 10 and the universal assembly platform 14 can be implemented using any energy cell(s) 22 (e.g., lead acid batteries) such that at least a portion of energy cell(s) 22 are disposed on top of or above the universal assembly platform 14, as exemplarily illustrated in FIG. 9.

The motor 34 is electrically connectable to the energy cell(s) 22 such that the energy cell(s) 22 controllably provide electrical energy (e.g., voltage and current) to the motor 34. The motor 34 receives the electrical energy from the energy cell(s) 22 and operates to output torque to the drivetrain 46 and thereby provide motive force to the vehicle 10.

In various implementations, the passenger compartment 36 generally includes the dash console 48, one or more passenger seat 50 structured and operable to provide seating for one or more vehicle occupants, e.g., a driver and one or more passengers, a steering wheel 54 for use by the vehicle operator to control the directional movement of the vehicle 10, a brake pedal 58 for use by the vehicle operator to control slowing and stopping of the vehicle 10, and an accelerator pedal 62 for use by the vehicle operator to control the torque delivered by the electric motor 34 to one or more of the rear and/or front suspension and wheel assemblies 38 and/or 42.

It is envisioned that the universal assembly platform 14 can be utilized as a base platform from which a plurality of lightweight vehicles can be assembled and configured, thereby simplifying and streamline the assembly process for lightweight vehicle manufactures. Particularly, by providing energy cell reservoir(s) 18 internally within the universal assembly platform 14, beneath the floorboard 30, the universal assembly platform 14 provides substantially more flexibility and options for the placement and orientation of various vehicle components, such as the seating structure(s) 50, the electric motor 34, the drivetrain 46, the front suspension and wheel assembly 38, and the rear suspension and wheel assembly 42. Moreover, the universal assembly platform 14 can be fabricated to have any desired length and width desired for assembly of various lightweight vehicles that can utilize a universal assembly platform 14 having the same length and width. For example, the same universal assembly platform 14 can be utilized to assemble a golf car having a golf bag rack (see FIG. 6A), a work utility vehicle have a cargo bed (e.g., a fixed or dump cargo bed) (see FIG. 6B), a transport vehicle having two or more rows of forward facing seats (see FIG. 6C), etc.

Referring now to FIGS. 1A, 1B, 2A, 2B, 3A and 3B, as described above, the universal assembly platform 14 comprises the main vehicle chassis structure 26, the floorboard 30 disposed over the top of the main vehicle chassis structure 26, and the energy cell reservoir(s) 18 disposed below the floorboard 30. The main vehicle chassis structure 26 can be any suitable vehicle chassis structure or vehicle frame that is structured and operable to provide the main support structure on which the vehicle 10 is assembled or built.

Figure 2B:
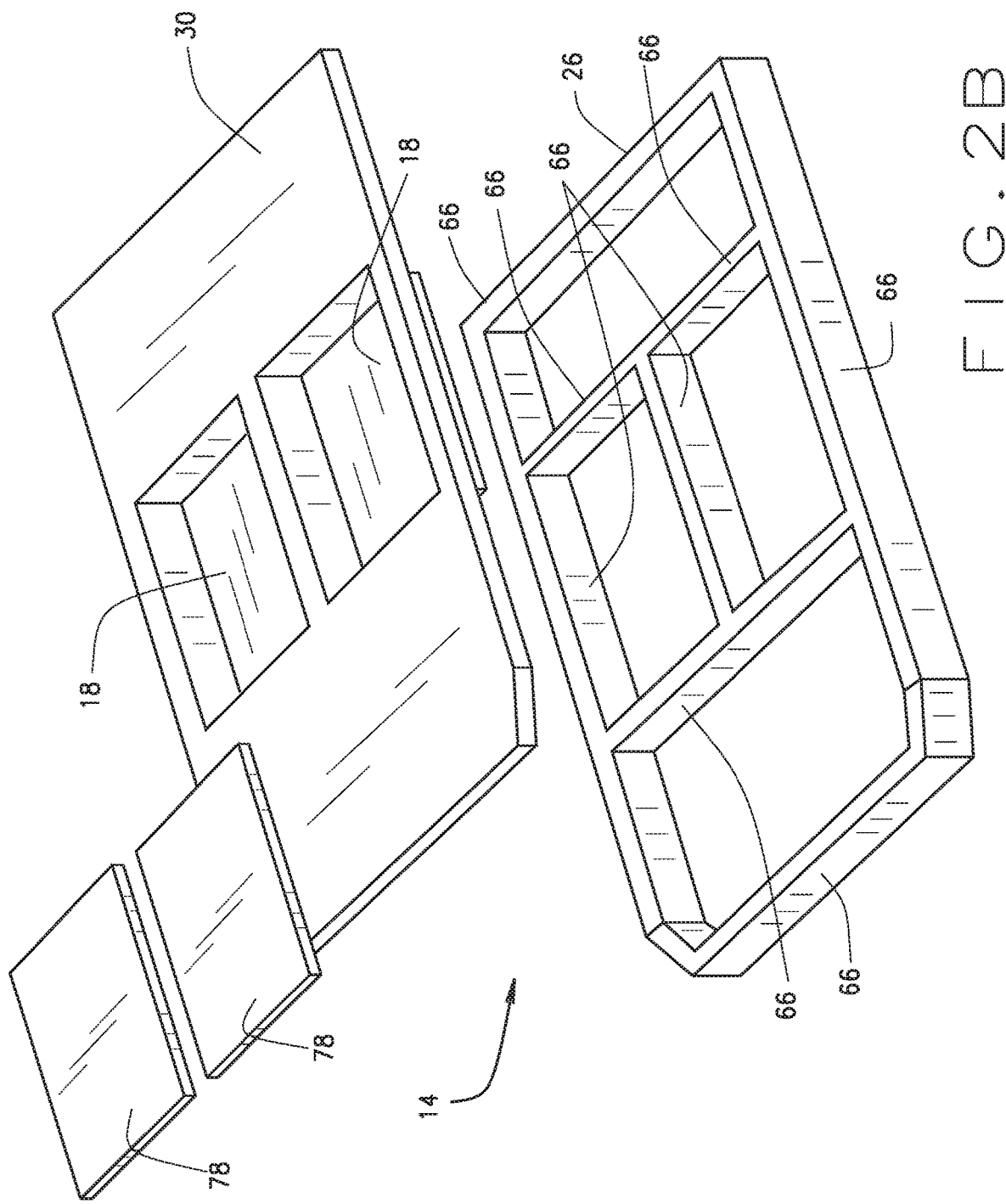
FIG. 2B is an exploded view of an exemplary embodiment of the universal assembly platform shown in FIGS. 1A and 1B, in accordance with other various embodiments of the present disclosure.

For example, as exemplarily illustrated in FIGS. 2A and 2B, in various embodiments, the main vehicle chassis structure 26 can comprise a frame, for example a metal frame (e.g., a steel or aluminum frame as exemplarily illustrated in FIG. 2A), that includes a plurality of interconnected or joined solid beams or hollow tubes 66 that provide the rigidity and structural integrity of main vehicle chassis structure 26. As exemplarily illustrated in FIG. 2A, in various instances of such embodiments, one or more portions of a bottom of the frame can be covered by one or more bottom plates 70 such that the energy cell reservoir(s) 18 are disposed or formed within the frame, between various ones of the beams/tubes 66. Accordingly, in such instances, the energy cell(s) 22 can be disposed within the energy cell reservoir(s) 18 provided between the frame beams/tubes 66 that form the main vehicle chassis structure 26, and then the floorboard 30 can be placed on, and connected to, the top of the frame such that the energy cell(s) is/are disposed beneath the floorboard 30 and internally within the universal assembly platform 14.

Alternatively, in various instances of such embodiments, the floorboard 30 can comprise opening(s) 74 (exemplarily illustrated in dashed lines in FIG. 2A), that align with the energy cell reservoir(s) 18 and cover(s) 78 (shown FIG. 2B) that fit within the opening(s) 74. Hence, in such instances the floorboard 30 can be placed on, and connected to, the top of the frame/main vehicle chassis structure 26, thereafter the energy cell(s) 22 can be disposed within the energy cell reservoir(s) 18, via the opening(s) 74, and the cover(s) 78 placed over the energy cell(s) 22 such that the energy cell(s) is/are disposed beneath the floorboard 30 and internally within the universal assembly platform 14.

Furthermore, as exemplarily illustrated in FIG. 2B, in various instances wherein the main vehicle chassis structure 26 comprises a frame, the floorboard 30 can be fabricated to have the energy cell reservoir(s) 18 recessed therein such that the energy cell reservoir(s) 18 is/are disposed between the beam/tubes 66 when the floorboard 30 is placed on, and connected to, the top of the main vehicle chassis structure 26. In such embodiments, the floorboard 30 can include the covers 78 that fit within the top openings of the energy cell reservoir(s) 18. Hence, in such instances, after the floorboard 30 has been placed on, and connected to, the top of the frame/main vehicle chassis structure 26 the energy cell(s) 22 can be disposed within the energy cell reservoir(s) 18, and the cover(s) 78 placed over the energy cell(s) 22 such that the energy cell(s) is/are disposed beneath the floorboard 30 and internally within the universal assembly platform 14.

It should be understood that the design and layout of the frame that forms the main vehicle chassis structure 26 shown in FIGS. 2A and 2B is only exemplary and that the frame can have any other desired design and layout and remain within the scope of the present disclosure.

Figure 3B:
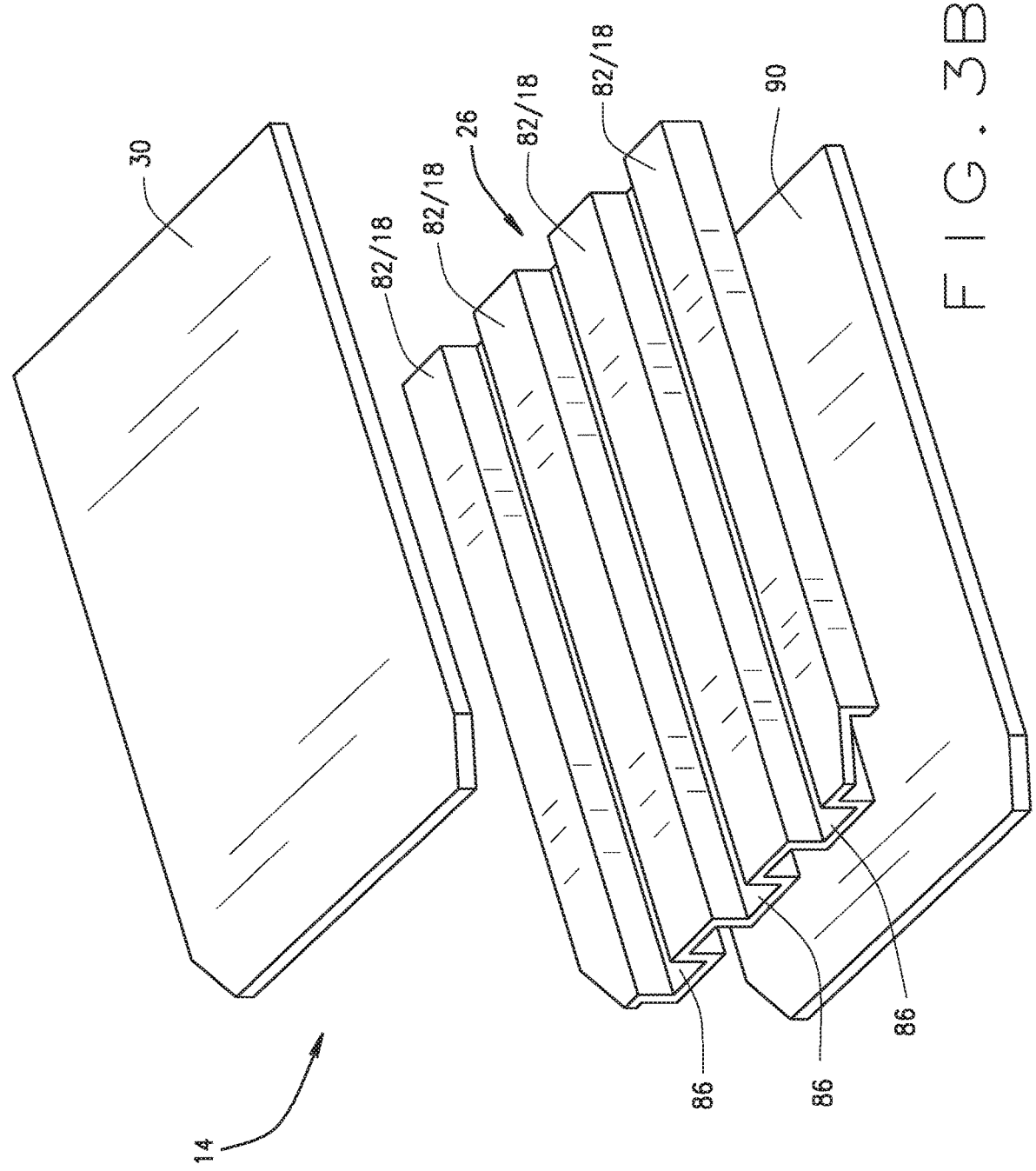
FIG. 3B is an exploded view of an exemplary embodiment of the universal assembly platform shown in FIGS. 1A and 1B, in accordance with still yet other various embodiments of the present disclosure.

As another example, as exemplarily illustrated in FIGS. 3A and 3B, in various embodiments, the main vehicle chassis structure 26 can comprise a corrugated unibody floor pan (e.g., an extruded or roll formed unibody floor pan) comprising a plurality of alternating raised ridges 82 and recessed channels 86 that provide the rigidity and structural integrity of main vehicle chassis structure 26. The raised ridges 82 and recessed ridges can have generally any shape and are not limited to the square shape exemplarily illustrated in the figures. As exemplarily illustrated in FIG. 3A, in various instances of such embodiments, one or more of the recessed channels 86 can provide the energy cell reservoir(s) 18. As described above, the energy cell(s) can be manufactured to have generally any desired shape and size. Hence, in such instances, the energy cell(s) 22 (e.g., lithium ion battery(ies)) can be fabricated to have a shape that will fit within the recessed channels/energy cell reservoir(s) 86/18. Accordingly, in such instances, the energy cell(s) 22 can be disposed within one or more of the recessed channels/energy cell reservoir(s) 86/18 of the corrugated unibody floor pan that forms the main vehicle chassis structure 26. Thereafter, the floorboard 30 can be placed on, and connected to, the top of the corrugated unibody floor pan/main vehicle chassis structure 26 such that the energy cell(s) 22 is/are disposed beneath the floorboard 30 and internally within the universal assembly platform 14.

Alternatively, as exemplarily illustrated in FIG. 3B, in various instances wherein the main vehicle chassis structure 26 comprises a corrugated unibody floor pan, one or more of the raised ridges 82 can provide the energy cell reservoir(s) 18. In such instances, the universal assembly platform can further comprise at least one retention panel 90 that can be connected to the bottom of the corrugated unibody floor pan to retain the energy cell(s) 22 within the raised ridge(s) 82. The retention panel(s) 90 can be any size and shape suitable to retain the energy cell(s) 22 within the raised ridge(s) 82. Accordingly, in such instances, the floorboard 30 can be placed on, and connected to, the top of the corrugated unibody floor pan/main vehicle chassis structure 26 and the energy cell(s) 22 can be disposed within one or more of the raised ridges/energy cell reservoir(s) 82/18 of the corrugated unibody floor pan that forms the main vehicle chassis structure 26. Thereafter, the retention panel(s) 90 can be connected to the corrugated unibody floor pan/main vehicle chassis structure 26 to retain the energy cell(s) 22 within the raised ridge(s) 82 such that the energy cell(s) 22 is/are disposed beneath the floorboard 30 and internally within the universal assembly platform 14.

It is envisioned that, in various embodiments, the recessed channels 86 and/or the raised ridges 82 can provide chases to house wiring, cabling, pneumatic and/or hydraulic hoses/tubing, drivetrain components, etc. of the vehicle 10.

As another example, as exemplarily illustrated in FIG. 7B, in various embodiments, the main vehicle chassis structure 26 can comprise a substantially flat unibody floor pan (e.g., an extruded or roll formed unibody floor pan) comprising a plurality of truss beams 106 formed therein that provide the rigidity and structural integrity of main vehicle chassis structure 26. The truss beams 106 can have generally any shape and are not limited to the square shape exemplarily illustrated in the figures. In various instances of such embodiments, one or more of the recessed pan areas 110 can provide the energy cell reservoir(s) 18. As described above, the energy cell(s) can be manufactured to have generally any desired shape and size. Hence, in such instances, the energy cell(s) 22 (e.g., lithium ion battery(ies)) can be fabricated to have a shape that will fit within the recessed pan areas 110/18. Accordingly, in such instances, the energy cell(s) 22 can be disposed within one or more of the recessed pan areas 110/18 of the unibody floor pan that forms the main vehicle chassis structure 26. Thereafter, the floorboard 30 (shown in FIG. 9) can be placed on, and connected to, the top of the unibody floor pan/main vehicle chassis structure 26 such that the energy cell(s) 22 is/are disposed beneath the floorboard 30 and internally within the universal assembly platform 14.

It is envisioned that in the embodiments wherein the main vehicle chassis structure 26 comprises the a unibody floor pan, such as exemplarily illustrated in FIGS. 3A, 3B, 4 and 7B, the unibody floor pan can be fabricated using any suitable fabrication method, such as extrusion or roll forming. Moreover, it is envisioned that in such embodiments, the unibody floor pan can be fabricated (e.g., extruded or roll formed) to standard lengths that are longer (e.g., substantially longer) than what is needed for use in the construction of any universal assembly platform 14 for any vehicle 10, such that the standard lengths can be simply cut to the desired length for use in construction of any desired vehicle 10. For example, a single standard length of the unibody floor pan can be cut into two or more sections, each having the same or different lengths, whereby each cut section can provide and be utilized as the main vehicle chassis structure 26 for two or more universal assembly platforms 14 for any vehicle 10.

With further reference to FIGS. 1A, 1B, 2A, 2B, 3A and 3B, although the energy cell reservoir(s) 18 is/are exemplarily shown throughout the various figures as being disposed generally in the middle of the universal assembly platform 14, the energy cell reservoir(s) 18 can be disposed or formed anywhere within the universal assembly platform 14, e.g., forward and/or rearward of where the energy cell reservoir (s) 18 are exemplarily shown, and remain within the scope of the present disclosure. Moreover, it is envisioned that in various instances the universal assembly platform 14 can include a plurality of energy cell reservoirs 18, wherein one or more energy cell reservoir 18 is/are disposed in the forward portion of the universal assembly platform 14, and/or one or more energy cell reservoir 18 is/are disposed in the middle portion of the universal assembly platform 14, and/or one or more energy cell reservoir 18 is/are disposed in the rearward portion of the universal assembly platform 14.

Figure 4:
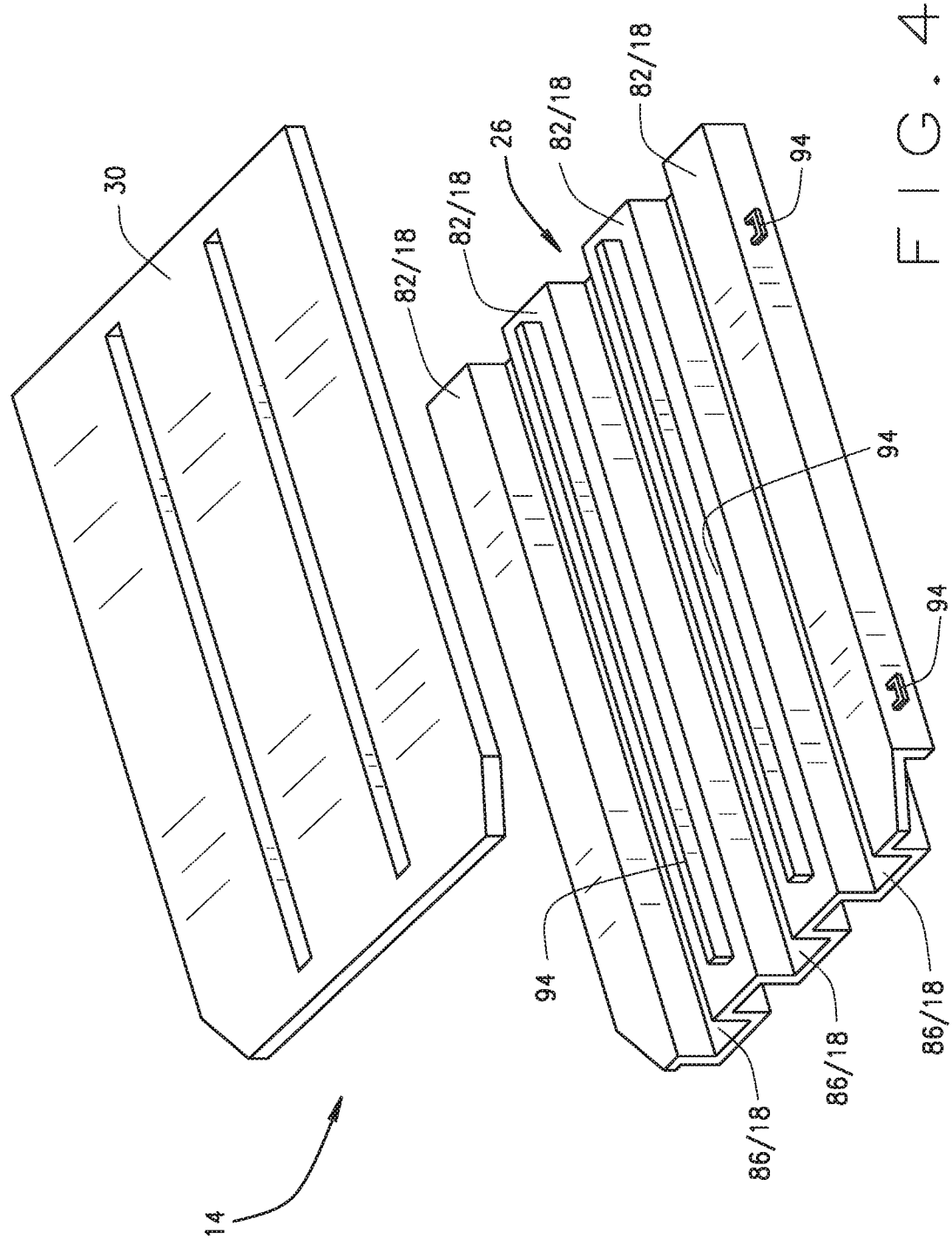
FIG. 4 is an exploded view of an exemplary embodiment of the universal assembly platform shown in FIGS. 1A and 1B comprising one or more component mounting structure, in accordance with still yet other various embodiments of the present disclosure.

Referring now to FIG. 4, in various embodiments, the universal assembly platform 14 can further comprise at least one vehicle component mounting structure 94 that is/are integrally formed with and/or mounted to the main vehicle chassis structure 26. The vehicle component mounting structure(s) 94 is/are structured and operable to enable at least one vehicle component to be mounted to the universal assembly platform 14 during assembly/construction of the vehicle 10. The vehicle component mounting structure(s) 94 can be any structure, indent, channel, pocket, aperture, etc., suitable for connecting or mounting vehicle components such as pedestals or other structure(s) to which seat(s) 50 are mounted, a front cowl of the vehicle, side panels of the vehicle, rollover protection systems (ROPS), canopy systems, the floorboard 30, etc. For example, in various instances the vehicle component mounting structure(s) 94 can be track(s) or channel(s) integrally formed with or connected to (e.g., welded to) the main vehicle chassis structure 26 for adjustably/movably mounting the seat pedestals (or other vehicle components) to the main vehicle chassis structure 26. Or, the vehicle component mounting structure(s) 94 can be hooks, or loops, or flanges, or tabs, or threaded bolts, or threaded holes, etc., that can be utilized to connect or mount various other vehicle components (e.g., front cowl, side panels, ROPS, canopy systems, the floorboard 30, etc.) to the main vehicle chassis structure 26.

In various embodiments, the universal assembly platform 14 can comprise mounting holes that are disposed in the same location for multiple vehicle types, wherein a vehicle component mounting structure(s) 94 specific to the respective vehicle 10 can be mounted to the holes in the universal assembly platform 14. For example, a vehicle 10 configured as a golf car can have a seat mounting rail configured to allow for a fixed number of longitudinal seat positions and a personal transport vehicle has a seat mounting structure that allows for more exact seat positioning through a larger range wherein both seat mounting structures are connectable to the same universal assembly platform without drilling additional holes.

Figure 5A:
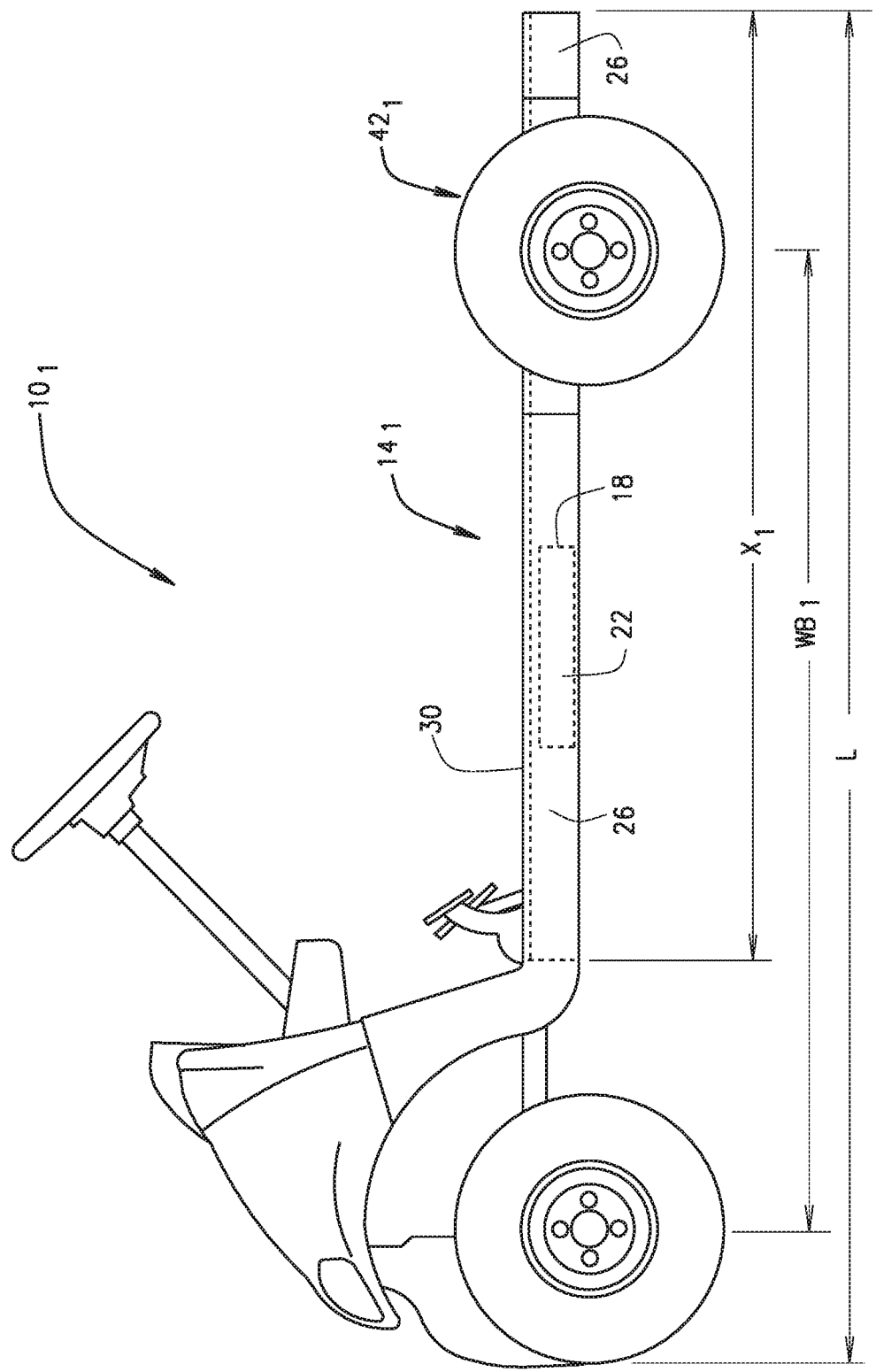
FIG. 5A is an exemplary illustration of a vehicle assembled utilizing the universal assembly platform shown in FIGS. 1A and 1B having a solid beam rear suspension and wheel assembly that is mounted forward of a rearward end of the universal assembly platform, in accordance with various embodiments of the present disclosure.
Figure 5B:
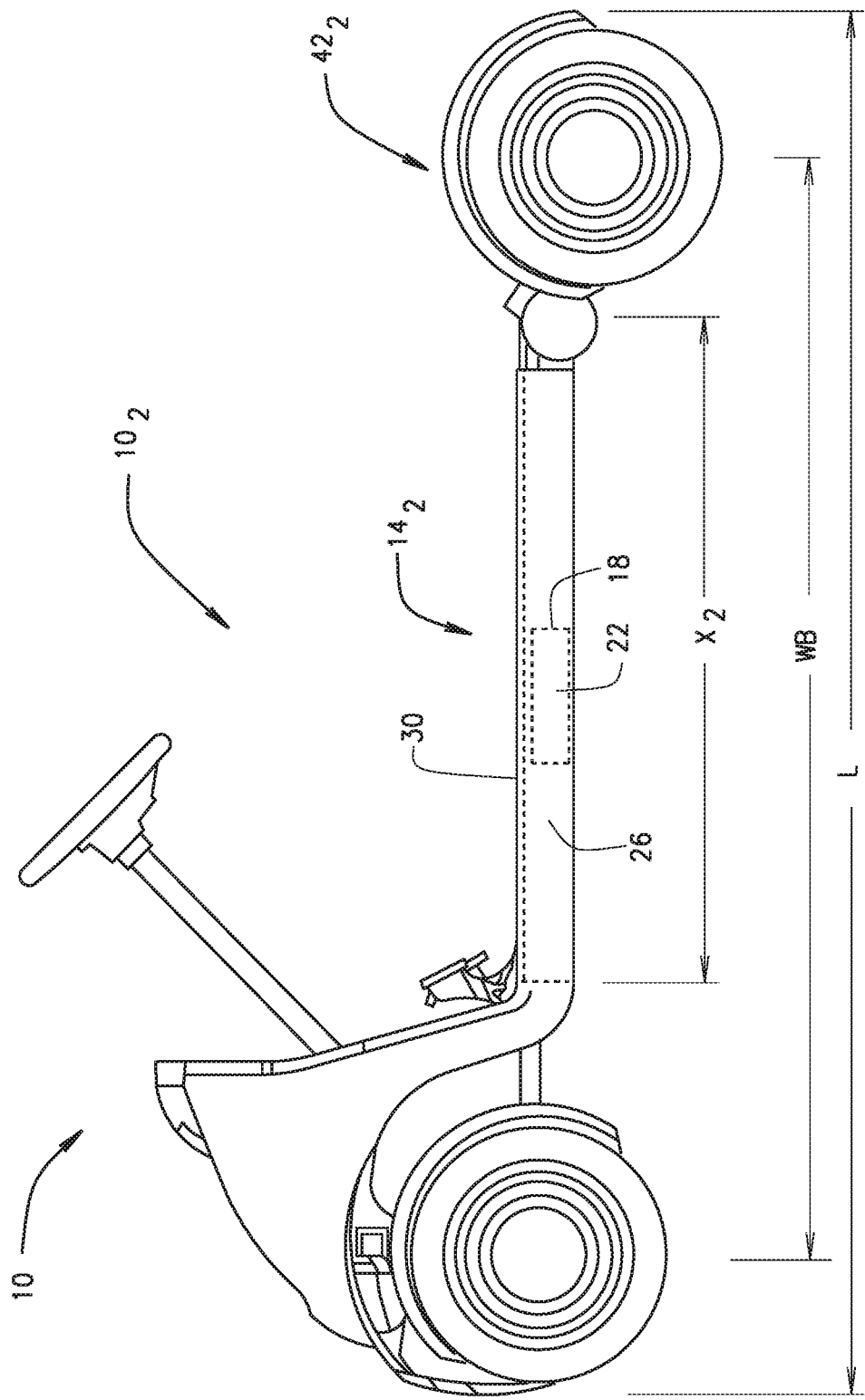
FIG. 5B is an exemplary illustration of a vehicle assembled utilizing the universal assembly platform shown in FIGS. 1A and 1B having an independent rear suspension and wheel assembly that is mounted to the rearward end of the universal assembly platform, in accordance with various embodiments of the present disclosure.

Referring now to FIGS. 5A and 5B, as described above, the universal assembly platform 14 provides vehicle manufacturers with the ability to produce/assemble a plurality of different types and/or configurations of vehicles utilizing the same universal assembly platform 14. Hence, a manufacturer can produce universal assembly platforms 14 having a desired length, width, height, and structural strength and rigidity, and then utilize the universal assembly platforms 14 (each having same the length, width, height, and structural strength and rigidity) to assemble golf cars and/or transport vehicles, and/or utility vehicles, and/or various other lightweight vehicles.

As also described above, universal assembly platform 14 can be manufactured to have various lengths, widths, heights, and structural strength and rigidity based on the desired vehicle type and vehicle configuration to be assembled. For example, a first universal assembly platform $14_1$ having a length of $X_1$ can be fabricated for use in assembling a first vehicle $10_1$ having an overall length of L and configured to have a solid beam rear suspension and wheel assembly $42_1$ that is located forward of the rearward end of the universal assembly platform $14_1$, as shown in FIG. 5A, while a second universal assembly platform $14_2$ having a length of $X_2$ that is shorter than $X_1$ can be fabricated for use in assembling a second vehicle $10_2$ having the same overall length of L as the first vehicle $10_1$, but configured to have an independent rear suspension and wheel assembly $42_2$ that is mounted to the rearward end of the universal assembly platform $14_2$, as shown in FIG. 5B. Hence, the first and second vehicles $10_1$ and $10_2$ can be configured to have the same overall length L, but have different length wheel bases, wherein the wheel base $WB_2$ of the second vehicle $10_2$ is longer than the wheel base $WB_1$ of the first vehicle $10_1$.

As used herein, the word "forward" and the phrase "forward of" are used to describe the direction from a named component or structure toward the front of the vehicle (e.g., vehicle 10, $10_1$, or $10_2$). Similarly, as used herein, the word "rearward" and the phrase "rearward of" are used to describe the direction from a named component or structure toward the rear of the vehicle (e.g., vehicle 10, $10_1$, or $10_2$).

Furthermore, the universal assembly platform 14, as described herein, can be utilized to assemble vehicles such as the second vehicle $10_2$, as shown in FIG. 5B, that have the same overall length L and vehicle footprint as similar type known vehicles. For example, a transport vehicle can be assembled utilizing the universal assembly platform 14 and configured to have an independent rear suspension and wheel assembly 42 that is mounted to the rearward end of the universal assembly platform 14, such as exemplarily shown in FIG. 5B, wherein such a transport vehicle has the same overall length L and footprint as known vehicles assembled using a known chassis frame, exemplarily shown in FIG. 8, such as known golf cars, known transport vehicles, etc.

Referring now to FIGS. 5B, 6A, 6B and 6C, constructing a vehicle 10 utilizing the universal assembly platform 14 and configured to have an independent rear suspension and wheel assembly 42 that is mounted to the rearward end of the universal assembly platform 14, provides greater flexibility in vehicle design and in placement, location, orientation and configuration of various vehicle components such as the passenger seat(s) 50 and associated pedestal(s) (referred to herein as the seating structures). For example, as exemplarily shown in FIG. 6A, the vehicle 10 configured as a golf car utilizing the universal assembly platform 14 and having an independent rear suspension and wheel assembly 42 mounted to the rearward end of the universal assembly platform 14 allows for more space and flexibility for the placement, orientation, location and configuration of the golf bag retention system.

Figure 6B:
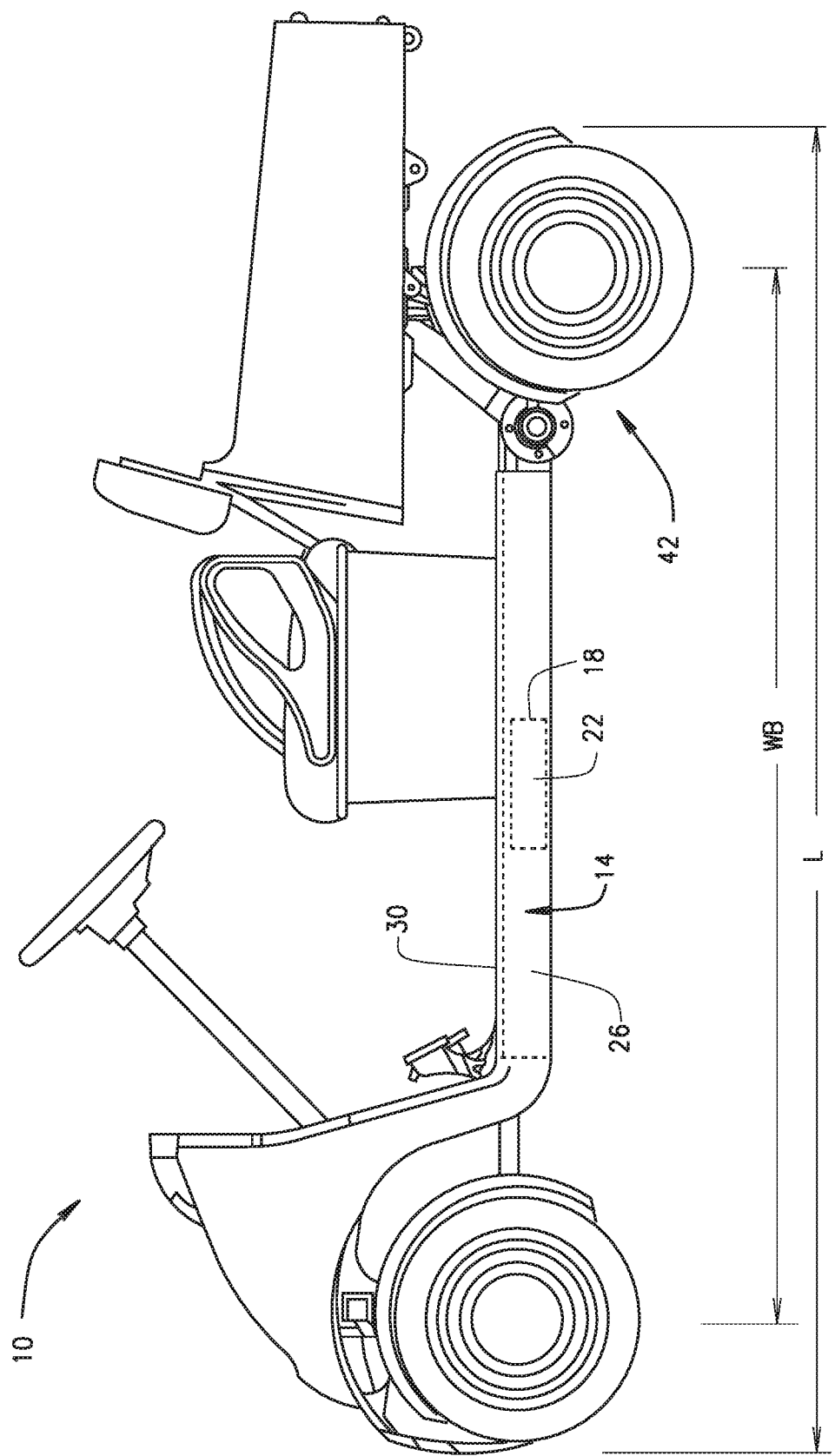
FIG. 6B is an exemplary illustration of a vehicle assembled utilizing the universal assembly platform shown in FIGS. 1A and 1B having an independent rear suspension and wheel assembly that is mounted to the rearward end of the universal assembly platform, wherein the vehicle is configured as a utility work vehicle, in accordance with various embodiments of the present disclosure.

As another example, shown in FIG. 6B, the vehicle 10 configured as a utility vehicle utilizing the universal assembly platform 14 and having an independent rear suspension and wheel assembly 42 mounted to the rearward end of the universal assembly platform 14 allows the vehicle 10 to be configured with a cargo bed (e.g., fixed or dump cargo bed) located directly above the rear suspension and wheel assembly 42. Locating the cargo directly above the rear suspension and wheel assembly 42 provides improved vehicle control and stability and increased cargo capacity and load limit.

As yet another example, as exemplarily shown in FIG. 6C, the vehicle 10 configured as a passenger transport vehicle utilizing the universal assembly platform 14 and having an independent rear suspension and wheel assembly 42 mounted to the rearward end of the universal assembly platform 14 allows the vehicle 10 to be configured with a second/rear row of forward facing passenger seats 50R located rearward of a front row of forward facing passenger seats 50F. In such configurations, the universal assembly platform 14 having the energy cell(s) 22 disposed internally therein beneath the floorboard 30 allows the second/rear row of forward facing passenger seats 50R to be located directly above the rear suspension and wheel assembly 42 such that the second/rear row of forward facing passenger seats is sufficiently spaced apart a foot room distance M from the first/front row of passenger seats 50F to provide ample and comfortable foot room distance M therebetween, e.g., 18 to 36 inches.

Assembling a vehicle 10 utilizing the universal assembly platform 14 and having an independent rear suspension and wheel assembly 42 mounted to the rearward end of the universal assembly platform 14 shifts the vehicle weight distribution toward the longitudinal middle of the vehicle which provides the vehicle 10 with a smoother ride, and improves the center of mass which provides greater vehicle stability and control. Moreover, as described herein and exemplarily illustrated in FIGS. 6A, 6B and 6C, the same universal assembly platform 14 (e.g., universal assembly platforms 14 having the same length, width, height, and structural strength and rigidity) can be utilized to assemble the golf car illustrated in FIG. 6A, the utility vehicle illustrated in FIG. 6B, and the transport vehicle having two rows of forward facing seats illustrated in FIG. 6C whereby each of the various vehicles will have the same overall length L, wheel base WB and footprint. Hence, the passenger transport vehicle shown in FIG. 6C can be shipped within substantially the same shipping envelope (e.g., within substantially the same space and shipping parameters) as the golf car shown in FIG. 6A, and furthermore within substantially the same shipping envelope as known golf cars (exemplarily shown in FIG. 8).

Referring now to FIGS. 1, 7A and 7B, in various embodiments, the universal assembly platform 14 can be connected to or include a front bulkhead 98 and/or a rear bulkhead 102 that are structured and operable to provide a connection means, or connecting structure for mounting various components of the vehicle 10 to the universal assembly platform 14. For example, in various instances, the front bulkhead 98 can be utilized to mount or connect the front suspension and wheel assembly 38 to the universal assembly platform 14, and/or the rear bulkhead 102 can be utilized to mount or connect the rear suspension and wheel assembly 42 to the universal assembly platform 14. Alternatively, the front and/or rear bulkhead(s) 98 and/or 102 can be utilized to mount the electric motor 34 to the universal assembly platform 14, or to mount all or a portion of the vehicle powertrain and/or driveline 46 to the universal assembly platform 14, or to mount any other vehicle component to the universal assembly platform 14.

As described above, although the universal assembly platform 14 has been described above with regard to an electrically powered vehicle 10 incorporating the electric motor 34, it is envisioned that in various embodiments, the vehicle 10 can be a gas powered vehicle comprising and internal combustion engine and corresponding drivetrain.

Although the universal assembly platform 14 has been described herein as having energy cell(s) 18 disposed within the energy cell reservoir(s) 18 beneath the floorboard 30 and internally within the universal assembly platform 14, it is envisioned that in various embodiments, as exemplarily shown in FIG. 9, the universal assembly platform 14 can be fabricated and structured as described above with or without the energy cell reservoir(s) 18, and the energy cell(s) 22 can be disposed at least partially above floorboard 30 and within seat pods, or pedestals, or platforms 114, and remain within the scope of the present disclosure. In such instances, as described above with regard to the embodiments comprising the energy cell reservoir(s) 18, the universal assembly platform 14 can be utilized as a base platform from which a plurality of lightweight vehicles, having the energy cell(s) 22 disposed at least partially above floorboard 30 can be assembled and configured, thereby simplifying and streamline the assembly process for lightweight vehicle manufactures.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A universal assembly platform for lightweight vehicles, said platform comprising:
   a main vehicle chassis structure;
   a floorboard disposed over a top of the main vehicle chassis structure and defining a floor surface of a passenger compartment of a lightweight vehicle assembled utilizing the universal assembly platform, wherein the floorboard and main vehicle chassis are structured to support at least one passenger seating structure; and
   at least one energy cell reservoir disposed below the floorboard, the at least one energy cell reservoir structured and operable to retain at least one prime mover energy cell.

2. The platform of claim 1 wherein the main vehicle chassis structure comprises a frame, and the floorboard comprises the at least one energy cell reservoir recessed therein such that the at least one energy cell reservoir is disposed beneath the floor surface.

3. The platform of claim 1, wherein the main vehicle chassis structure comprises a corrugated unibody floor pan having a plurality of raised ridges with recessed channels formed therebetween, and wherein the at least one energy cell reservoir comprises at least one of at least one of the channels and at least one of the ridges such that the at least one energy cell reservoir is disposed beneath the floor surface.

4. The platform of claim 3, wherein when the at least one energy cell reservoir comprises at least one of the ridges, the universal assembly platform further comprises at least one energy cell retention panel connectable to a bottom of the floor pan and structured and operable to retain the at least one energy cell within the at least one of the ridges.

5. The platform of claim 1 further comprising at least one vehicle component mounting structure at least one of integrally formed with and mounted to the main vehicle chassis structure, the at least one vehicle component mounting structure structured and operable to enable at least one vehicle component to be mounted thereto during assembly of a lightweight vehicle utilizing the universal assembly platform.

6. The platform of claim 1, wherein the main vehicle chassis structure is structured to be connectable to at least one of a front bulkhead and a rear bulkhead.

7. A lightweight vehicle, said lightweight vehicle comprising:
  a universal assembly platform, the universal assembly platform comprising:
    a main vehicle chassis structure;
    a floorboard disposed over a top of the main vehicle chassis structure and defining a floor surface of a passenger compartment of the lightweight vehicle, wherein the floorboard and main vehicle chassis are structured to support at least one passenger seating structure; and
    at least one energy cell reservoir disposed below the floorboard,
  a front suspension connected to the universal assembly platform;
  a rear suspension connected to the universal assembly platform;
  at least one prime mover energy cell disposed within the at least one energy cell reservoir such that the at least one prime mover energy cell is disposed beneath the floorboard; and
  an electric motor electrically connected to the at least one prime mover energy cell.

8. The vehicle of claim 7 wherein the main vehicle chassis structure comprises a frame, and the floorboard comprises the at least one energy cell reservoir recessed therein such that the at least one energy cell is disposed beneath the floor surface.

9. The vehicle of claim 7, wherein the main vehicle chassis structure comprises a corrugated unibody floor pan having a plurality of raised ridges with recessed channels formed therebetween, and wherein the at least one energy cell reservoir comprises at least one of at least one of the channels and at least one of the ridges such that the at least one energy cell is disposed beneath the floor surface.

10. The vehicle of claim 9, wherein when the at least one energy cell reservoir comprises at least one of the ridges, the universal assembly platform further comprises at least one energy cell retention panel connectable to a bottom of the floor pan and structured and operable to retain the at least one energy cell within the at least one of the ridges.

11. The vehicle of claim 7 further comprising at least one vehicle component mounting structure at least one of formed within and mounted to the main vehicle chassis structure, the at least one vehicle component mounting structure structured and operable to enable at least one vehicle component to be mounted thereto during assembly of the lightweight vehicle utilizing the universal assembly platform.

12. The vehicle of claim 7, wherein the vehicle further comprises at least one of:
  a front bulkhead mounted to the main vehicle chassis structure and to which the front suspension is mounted, and
  a rear bulkhead mounted to the main vehicle chassis structure and to which the rear suspension is mounted.

13. A lightweight vehicle, said lightweight vehicle comprising:
  a universal assembly platform, the universal assembly platform comprising:
    a main vehicle chassis structure;
    a floorboard disposed over a top of the main vehicle chassis structure and defining a floor surface of the lightweight vehicle; and
    at least one energy cell reservoir disposed below the floorboard,
  a front suspension connected to the universal assembly platform;
  a rear suspension connected to the universal assembly platform;
  at least one prime mover energy cell disposed within the at least one energy cell reservoir such that the at least one prime mover energy cell is disposed beneath the floorboard;
  an electric motor electrically connected to the at least one prime mover energy cell;
  a forward facing front seat mounted to universal assembly platform; and
  a forward facing rear seat mounted to the universal assembly platform rearward of the forward facing front seat.

14. The vehicle of claim 13 wherein the main vehicle chassis structure comprises a frame, and the floorboard comprises the at least one energy cell reservoir recessed therein such that the at least one energy cell is disposed beneath the floor surface.

15. The vehicle of claim 13, wherein the main vehicle chassis structure comprises a corrugated unibody floor pan having a plurality of raised ridges with recessed channels formed therebetween, and wherein the at least one energy cell reservoir comprises at least one of at least one of the channels and at least one of the ridges such that the at least one energy cell is disposed beneath the floor surface.

16. The vehicle of claim 15, wherein when the at least one energy cell reservoir comprises at least one of the ridges, the universal assembly platform further comprises at least one energy cell retention panel connectable to a bottom of the floor pan and structured and operable to retain the at least one energy cell within the at least one of the ridges.

17. The vehicle of claim 13, wherein the vehicle further comprises at least one of:
  a front bulkhead mounted to the main vehicle chassis structure and to which the front suspension is mounted, and
  a rear bulkhead mounted to the main vehicle chassis structure and to which the rear suspension is mounted.

18. The vehicle of claim 13 further comprising at least one vehicle component mounting structure at least one of formed within and mounted to the main vehicle chassis structure, the at least one vehicle component mounting structure structured and operable to enable at least one vehicle component to be mounted thereto during assembly of the lightweight vehicle utilizing the universal assembly platform.

19. The vehicle of claim 18, wherein the at least one vehicle component mounting structure comprises at least one mounting track mounted to main vehicle chassis structure longitudinally along at least a portion of the universal assembly platform.

20. The vehicle of claim 19, wherein at least one of the forward facing front seat and the forward facing rear seat is mounted to the at least one mounting track.

* * * * *